US006869359B1

(12) United States Patent
Mathews

(10) Patent No.: US 6,869,359 B1
(45) Date of Patent: Mar. 22, 2005

(54) ROULETTE-TYPE GAMING APPARATUS AND METHOD FOR PLAYING THE SAME

(76) Inventor: Marc Mathews, P.O. Box 10165, Zephyr Cove, NV (US) 89448

( * ) Notice: Subject to any disclaimer, the term of this patent is extended or adjusted under 35 U.S.C. 154(b) by 0 days.

(21) Appl. No.: 10/642,383

(22) Filed: Aug. 14, 2003

Related U.S. Application Data

(60) Provisional application No. 60/403,811, filed on Aug. 16, 2002.

(51) Int. Cl.$^{7}$ .......................... A63F 5/00; A63F 13/00; G07F 17/34

(52) U.S. Cl. ...................... 463/17; 463/20; 273/142 R; 273/142 E; 273/138.2; 273/143 R

(58) Field of Search ......................... 273/142 R, 142 E, 273/142 HA, 274, 138.1, 138.2, 193 R; 463/17, 20

(56) References Cited

U.S. PATENT DOCUMENTS 4,760,527 A * 7/1988 Sidley ......................... 463/13
5,259,616 A * 11/1993 Bergmann ................... 463/17
6,209,869 B1 * 4/2001 Mathews ................. 273/138.1
2002/0074725 A1 * 6/2002 Stern .......................... 273/274
2003/0050110 A1 * 3/2003 Wichinsky .................. 463/17

* cited by examiner

*Primary Examiner*—Benjamin Layno

(57) ABSTRACT

A gaming apparatus includes a housing with a front operable surface and a visual display region thereon. The visual display region includes a plurality of windows disposed in a rectangular positional array of four rows and four columns with a plurality of paylines defined by a line intersecting four adjacent elements in a single row, column or diagonal on the array. A button or mechanical arm on the housing will cause all of the symbols in the array to be randomly selected and displayed as part of a gaming sequence. A payout is generated if one or more of the selected paylines contain a predetermined number of predetermined symbols. In a second embodiment of the invention, the housing includes a screen display of a roulette wheel of the type having four different colored balls simultaneously moving around the wheel, each ball operable to fall within one of thirty-eight slots on the wheel and the slots of a size to receive up to all four balls. Four windows are positioned on the housing, each window associated with one of said balls on the roulette wheel and displaying a symbol displayed in a slot within which the associated ball falls at the end of a gaming sequence. The machine generates payouts based upon the display of selected symbols from the roulette wheel within a predetermined number of the windows.

8 Claims, 5 Drawing Sheets

ROULETTE-TYPE GAMING APPARATUS AND METHOD FOR PLAYING THE SAME

CROSS-REFERENCES TO RELATED APPLICATIONS

This application claims the benefit of U.S. Provisional Application Ser. No. 60/403,811, filed Aug. 16, 2002.

STATEMENT AS TO RIGHTS TO INVENTIONS MADE UNDER FEDERALLY SPONSORED RESEARCH AND DEVELOPMENT (Not applicable)

BACKGROUND OF THE INVENTION (1) Field of the Invention

The present invention relates generally to gaming methods and apparatus of the slot machine type, and more particularly to an improved gaming apparatus that incorporates the features of the game of roulette, modified with improved multiple paylines for additional excitement and profit potential.

(2) Background Information

Gambling and games of chance are popular sources of entertainment for many people. Such games of chance are more enjoyable if a variety of different gaming apparatus are available to the player. New forms of gaming apparatus and new methods of playing existing games can generate new interest and enthusiasm in this activity.

One game that has been popular through the years is the game of roulette. In this game, a single rolling ball is propelled around a generally circular track in a direction opposite the rotation of a central wheel. Wagers are placed on the likelihood of the ball landing in a particular pocket or cassette formed around the perimeter of the central wheel.

While roulette has been a gaming apparatus present in casinos for many years, it has been becoming less popular in the recent past. While many reasons have been given for this reduction in popularity, today's gamblers have found conventional roulette to be "boring" and "too predictable" a game.

The inventor herein has modified the game of roulette to expand the game to four simultaneous games of roulette played on a single gaming apparatus. This modified gaming method, designated as "Quad-Roulette" throughout this specification, is the subject of two issued patents, namely, U.S. Pat. No. 6,497,409 entitled "Method for Roulette-Type Games", and U.S. Pat. No. 6,209,869, entitled "Method and Apparatus for Roulette-Type Games". The subject matter of both patents is incorporated herein for reference purposes.

There are several reasons why slot machines are an ever-increasing factor relating to a casino's overall financial success. Increased competition in the casino industry has prompted operators and owner to bring more and newer types of slot machines into their establishments at a much higher rate, and much sooner, than they had at any time throughout the history of the slot machine. Also, today's casino players are more sophisticated, and thus demand more challenging game environments, such as games that are connected or related to other casino games. Simply put, there is a high demand for a new generation of gaming equipment with new and unique features.

Historically, slot machines were of the three-window configuration, with three vertically oriented wheels rotating independently of one another behind three horizontally arranged windows. Typically, each wheel included 10 separate symbols, which would then be aligned horizontally within the windows. The consumer would "win" based upon the particular arrangement of symbols in the three windows.

This game was then augmented by providing three horizontal rows of windows, with possible paylines horizontally along any of the three rows, or diagonally. This in turn was augmented with additional windows in each horizontal row, with the most known to the inventor to be three rows of five windows. However, some recent new slot designs which display five or more windows are considered more confusing than fun. This is especially true of those games where a payline is not a straight horizontal, vertical or diagonal line, but rather weaves up and down among the horizontal rows of windows from side to side.

One attempt to overcome this problem is set out in U.S. Pat. No. 6,241,607 to Payne et al., wherein a non-rectangular and/or non-orthogonal arrangement of gambling elements are disclosed. While this patent addresses some of the problems of prior art devices, it is believed that the non-rectangular arrangement of elements detracts from the simplicity of straight line horizontal and vertical paylines with only two diagonal paylines.

BRIEF SUMMARY OF THE INVENTION

It is therefore a general object of the present invention to provide an improved method and gaming apparatus which incorporates the principles of a roulette-type game.

A further object of the present invention is to provide a method and gaming apparatus, which provides more possible combinations of visual elements in each window, and more opportunities for betting on the results of random generation of a visual element in each window, than previous slot machines.

Yet another object is to provide a method and gaming apparatus that is simple to play, and provides a possible progressive jackpot.

Still a further object of the present invention is to provide a slot machine arrangement that provides multiple straight horizontal, vertical and diagonal paylines in a rectangular arrangement, enhancing the gaming experience with additional easy-to-see payline possibilities.

These and other objects will be apparent to those skilled in the art.

The gaming apparatus of the present invention includes a housing with a front operable surface and a visual display region thereon. The visual display region includes a plurality of windows disposed in a rectangular positional array of four rows and four columns with a plurality of paylines defined by a line intersecting four adjacent elements in a single row, column or diagonal on the array, where the preferred embodiment has sixteen windows in an orthogonal arrangement and ten straight paylines of four windows per payline. A button or mechanical arm on the housing will cause all of the symbols in the array to be randomly selected and displayed as part of a gaming sequence. A payout is generated if one or more of the selected paylines contain a predetermined number of predetermined symbols. In a second embodiment of the invention, the housing includes a screen display of a roulette wheel of the type having four different colored balls simultaneously moving around the wheel, each ball operable to fall within one of thirty-eight slots on the wheel and the slots of a size to receive up to all four balls. Four windows are positioned on the housing, each window associated with one of said balls on the roulette wheel and displaying a symbol displayed in a slot with in which the associated ball falls at the end of a gaming sequence. The machine generates payouts based upon the display of selected symbols from the roulette wheel within a predetermined number of the windows.

BRIEF DESCRIPTION OF THE SEVERAL VIEWS OF THE DRAWING

The preferred embodiment of the invention is illustrated in the accompanying drawings, in which similar or corresponding parts are identified with the same reference numeral throughout the several views, and in which.

DETAILED DESCRIPTION OF THE INVENTION

Figure 1:
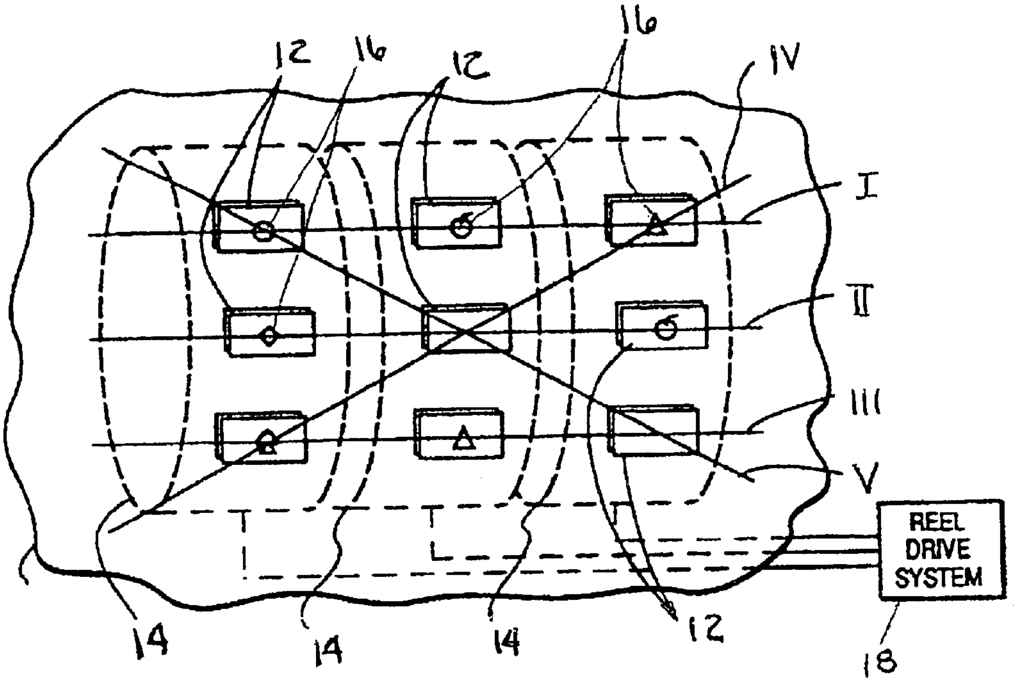
Fig. 1 (PRIOR ART)
FIG. 1 is a depiction of a prior art three-reel game having multiple paylines.

Referring now to the drawings, in which similar or corresponding parts are identified with the same reference numeral, and more particularly to FIG. 1, a prior art slot machine of the type having three rows of three windows 12 with three vertically oriented reels 14 disposed behind the windows. Each reel 14 has a plurality of symbols 16 printed thereon, arranged for display through a window 12. The reels 14 are individually driven and selectively and independently stopped by a drive system 18. As shown in FIG. 1, five individual paylines are indicated by Roman numerals I–V.

Figure 2:
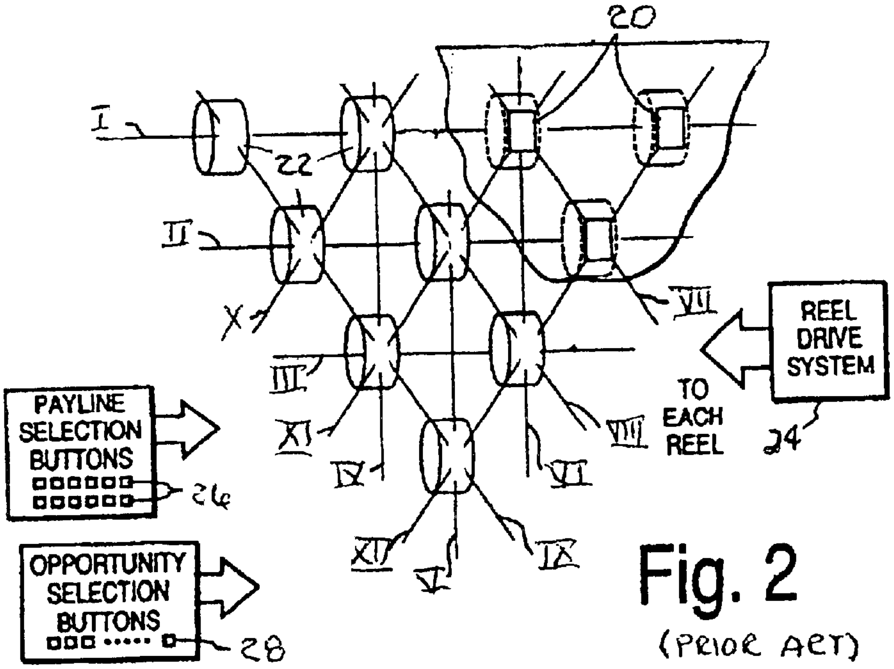
Fig. 2 (PRIOR ART)
FIG. 2 is a schematic depiction of a ten-reel embodiment of a prior art multiple reel, multiple payline non-rectangular game.

FIG. 2 depicts a second prior art slot machine of the type having a non-rectangular arrangement of windows 20. This device includes 10 reels 22 having a plurality of symbols thereon for display through an associated window 20. Reels 22 are individually driven and selectively and independently stopped by drive system 24. The triangular arrange ment of windows 20 offers three horizontal paylines I, II and III, three vertical paylines IV, V and VI, three leftward inclined paylines VII, VIII and IX, and three rightward inclines paylines X, XI and XII. The apparatus of FIG. 2 also provides a plurality of buttons 26 for selecting paylines, and a plurality of buttons 28 for selecting various outcome opportunities.

Figure 3:
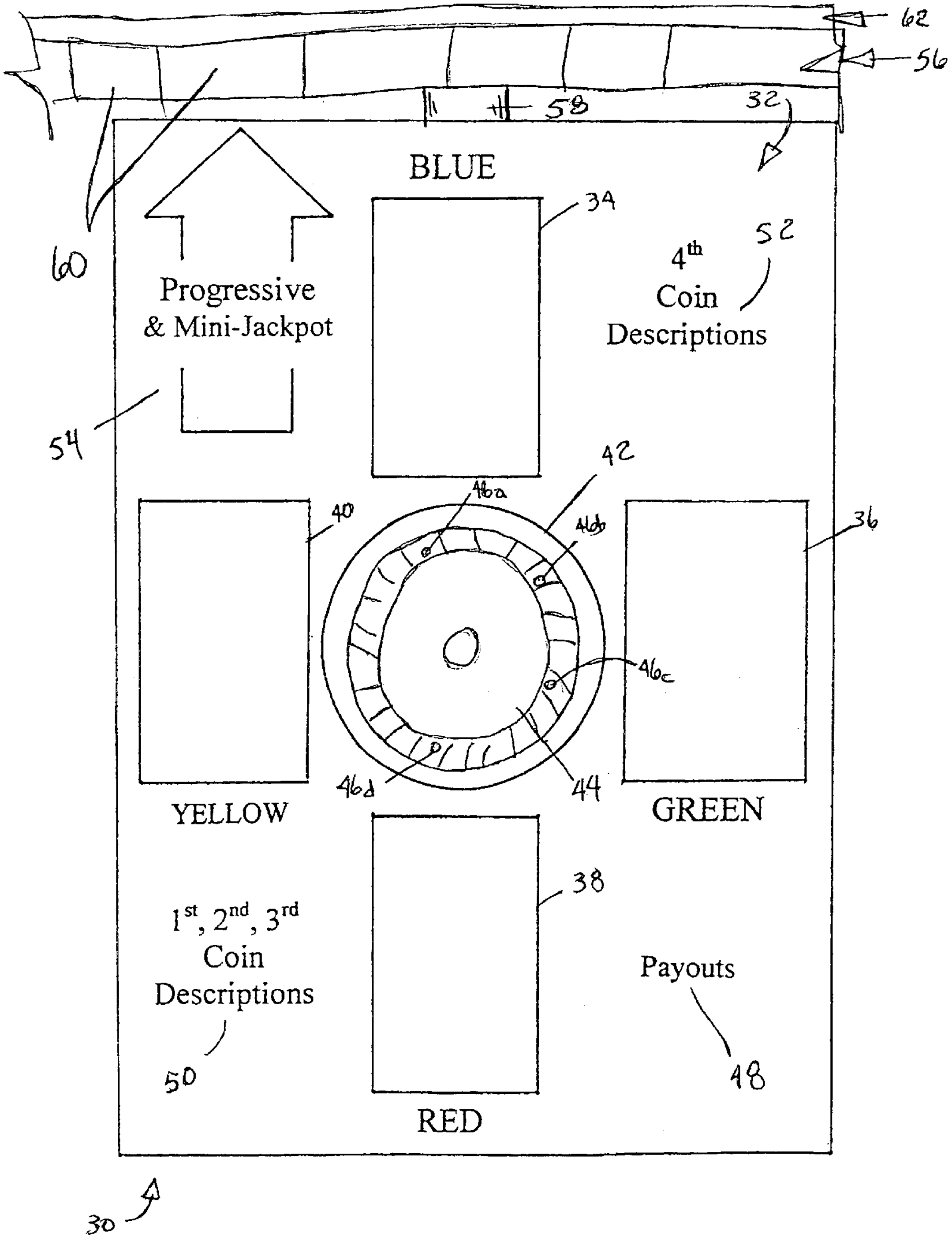
FIG. 3 is an elevational view of a face of a first embodiment of a slot machine incorporating the roulette-type game of the present invention.

Referring now to FIG. 3, the gaming apparatus of the present invention is designated generally at 30, with the face of the apparatus depicted schematically at 32. In the preferred embodiment of the invention, four windows 34, 36, 38 and 40 are arranged around a central display region 42. Each window will display a number or symbol generated in the central display region 42. The central display region 42 will display a video-linked or animated depiction of a roulette wheel 44 with multiple balls **46*a*, 46*b*, 46*c*, and 46*d*. In the preferred embodiment, there will be four balls 46 that are used on the wheel, one ball for each window 34–40. In order easily associate a ball with a window, each ball and window are given the same color. In this case, window 34 is blue, window 36 is green, window 38 is red and window 40 is yellow. Thus, a blue, green, red and yellow ball 46 would be displayed on the roulette wheel 44 displayed in region 42**.

Roulette wheel 44 is preferably of the type described in the inventors previous patents, U.S. Pat. No. 6,497,409 and U.S. Pat. No. 6,209,869, which enables the simultaneous motion of four balls on a single wheel. Wheel 44 includes 36 numbers, ranging from 1–36, with 18 numbers on a red background and 18 numbers on a black background. In addition, the wheel includes one number, preferably a "0" on a green background, and the numeral "37" displayed in purple and gold (or some other accentuated color scheme). The wheel 44 may either be animated in region 42, or linked by video to an actual roulette game off-site, with the wheel displayed on a video screen in region 42.

On each spin of wheel 44, the display region 42 shows the wheel 44 spinning and four different colored balls 46 rolling separately around wheel 44 to eventually fall within a slot with a designated number and color. Preferably, each window 34–40 would show the associated ball 46 traveling around the wheel 44 and falling within a slot. However, the only necessary display is the ending location of the associated ball 46.

There are preferably four different levels of possible winning combinations: (1) very small, frequent rewards; (2) medium-size less frequent rewards; (3) a standard mini-jackpot (such as $10,000); and (4) a large progressive jackpot. The four different levels of winning are directly related to the number of coins which a patron spends on each spin, with the higher rewards associated with more coins played. One example of a payout schedule is set forth in the following table.

| Coins Played | Ending locations of balls | Payout |
|---|---|---|
| 1 | All four balls in black slot | Small |
| 1 | All four balls in red slot | Small |
| 1 | Any 3 of 4 in the same number slot | Small |
| 2 | All four balls in the same number slot | Medium |
| 3 | All four balls in green slot | Mini-Jackpot |
| 4 | All four balls in #37 slot | Progressive |

Each of the possible payouts is preferably listed on the face 32 in region 48. In addition, the descriptions of the possible payouts for the number of coins spent are listed in two regions 50 and 52 on face 32. The Progressive and Mini-Jackpot Payouts are displayed in region 54, with the patron directed upwardly to a separate ancillary wheel 56 for possible bonus round action earned by winning either the Mini-Jackpot or Progressive payouts.

Figure 4:
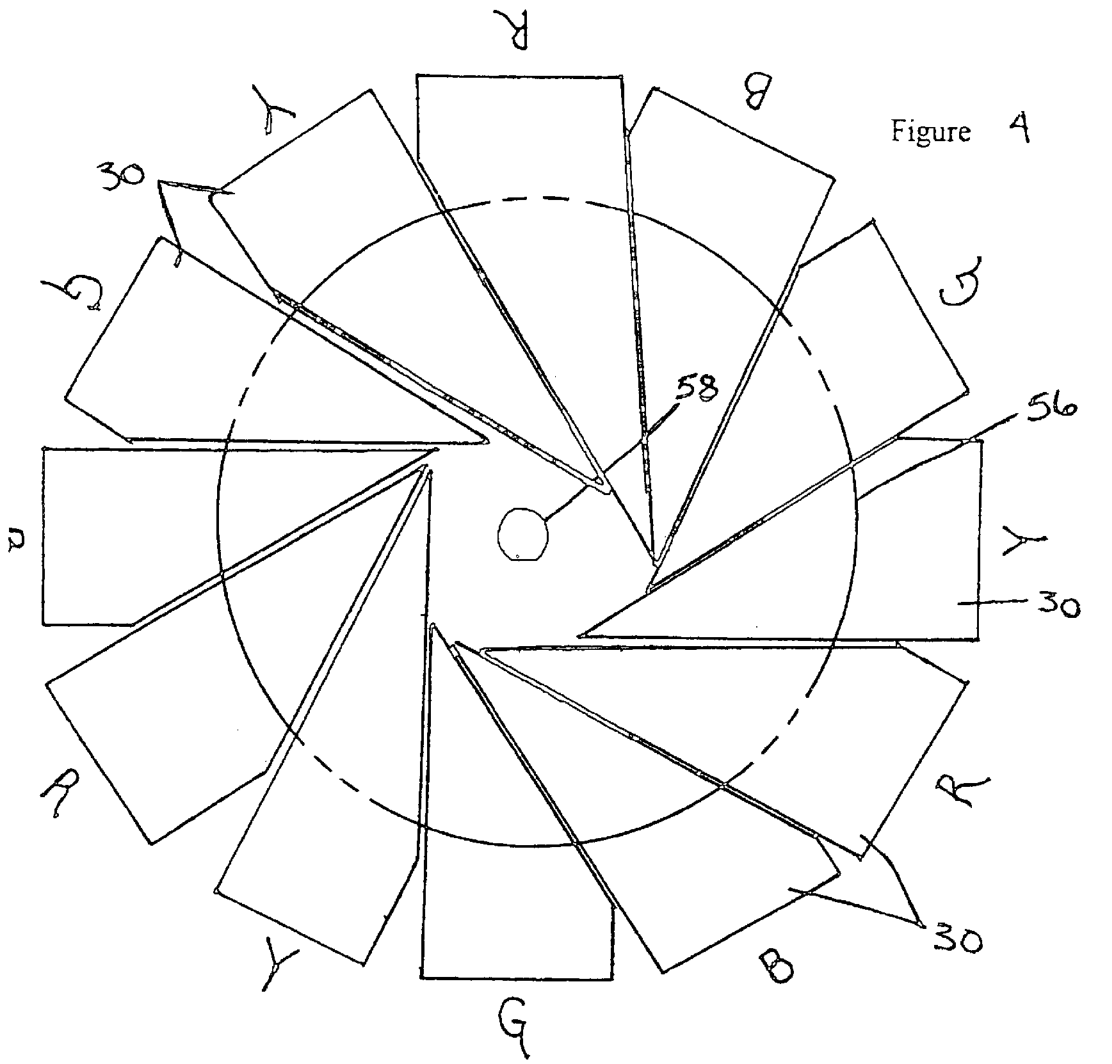
FIG. 4 is a plan view of a first arrangement of a bank of slot machines of the present invention.

Referring now to FIG. 4, a bank of slot machines 30 is shown, with the bank arranged in a generally circular orientation. A support stand 58 is centered among the machines 30, to support the ancillary wheel 56 above the bank of machines 30. Ancillary wheel 58 is a large horizontally oriented roulette wheel with vertical "slots" 60 (shown in FIG. 3) that is operable to display a winning number on these vertical slots 60, so that patrons around the entire bank of machines 30, and in the entire casino, may easily view the results. A payout screen 62 encircling the ancillary wheel 56 continuously displays the amount of the Progressive jackpot, and may also display individual results of the Mini-Jackpot and Progressive bonus rounds.

As shown in the table above, when all balls in the four windows 34–40 fall in the green slot AND at least three coins have been spent on that particular round of play, then the patron has a chance at the Mini-Jackpot or its related payouts, as the upright horizontal roulette wheel 56 spins a bonus round. Similarly, when all four balls fall in the "37" slot, AND four coins have been spent on the round, then the patron has a chance to win the Major Progressive through a spin displayed on the upright roulette wheel 56.

Figure 5:
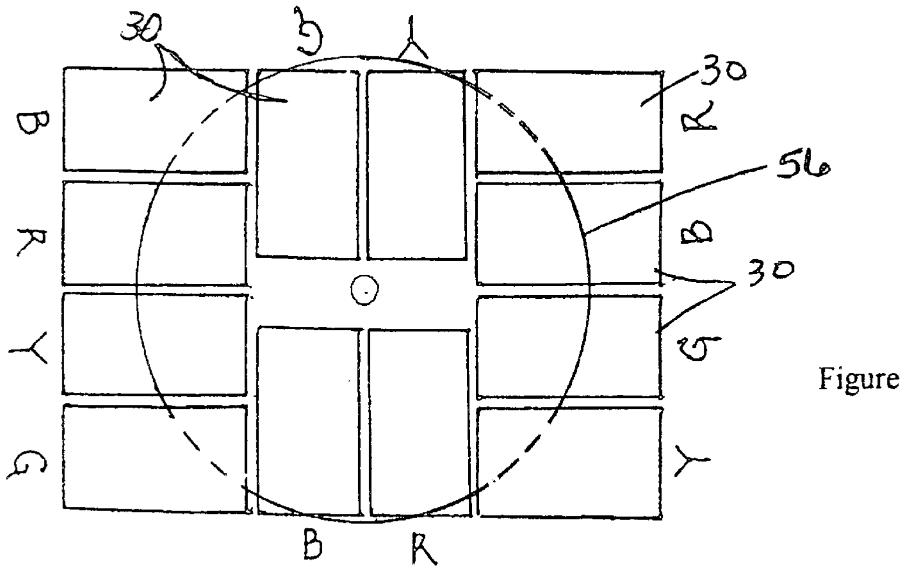
FIG. 5 is a plan view of a second arrangement of a bank of slot machines of the present invention.

FIG. 5 shows a rectangular bank of machines 30 with the upright ancillary wheel 56 displayed above the machines.

Figure 6:
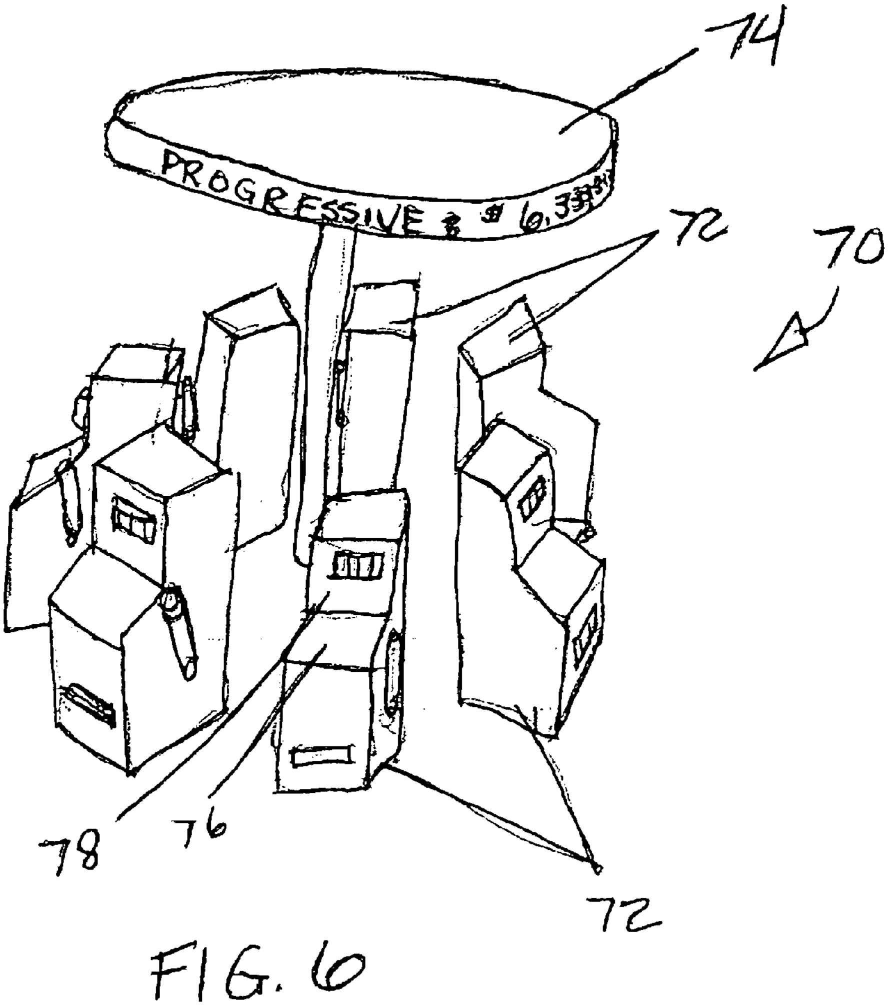
FIG. 6 is a perspective view of a bank of slot machines incorporating a second embodiment of the invention.

Referring now to FIG. 6, a second embodiment of the invention is designated generally at 70, and includes a bank of slot machines 72 arranged around an upright display 74. Each machine 72 is identical, and therefore only one machine will be described in detail herein. Each slot machine 72 preferably has a sloped face 76 and a vertical face 78 which together form the operating surfaces of the machine.

Figure 7:
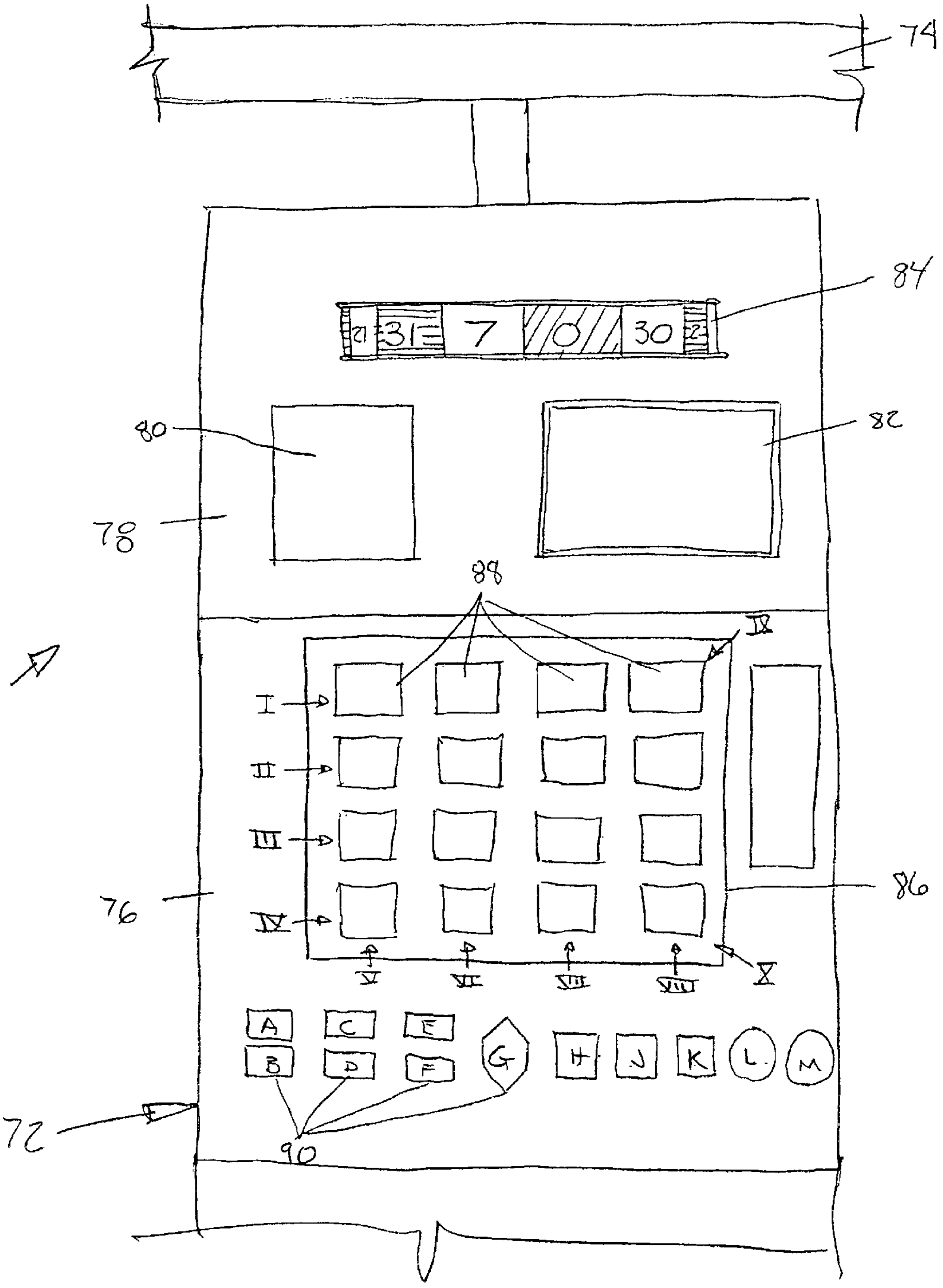
FIG. 7 is an elevational view of the operating surfaces of a slot machine incorporating the second embodiment of the game of the present invention.

Referring now to FIG. 7, the operating surfaces 76 and 78 of one machine 72 are shown in more detail. Upper operating surface 78 includes a region 80 displaying the various payouts for the machine 72. A display screen 82 is used for the display of a roulette wheel, which serves as the basis for the features of the game, in the same fashion as the first embodiment of the invention. A horizontally-oriented roulette wheel 84 has a portion projecting from the face 78, and is used for the Mini-Jackpot and the Progressive, in a manner similar to that described in the first embodiment. Rather than using a single roulette wheel over entire bank of machines, each machine has its own wheel 84, in this second embodiment of the invention. The results of the Progressive are displayed on display wheel 74, in a manner similar to the first embodiment of the invention.

Operating surface 76 includes a large display screen 86, with a rectangular arrangement of sixteen windows 88, with each window 88 representing an individual roulette wheel. Preferably each wheel includes 36 numbers, ranging from 1–36, with eighteen numbers on a red background and eighteen numbers on a black background. In addition, each wheel includes one number, preferably a "0" on a green background, and the numeral "37" displayed in purple and gold (or some other accentuated color scheme). Thus, each window 88 has thirty-eight possible symbols that may be displayed. Because each window is individually operable to display a random symbol, there are 10 very simple and straight-forward paylines for the patron to view. Paylines I, II, III and IV are conventional horizontal paylines. Paylines V, VI, VII and VIII are vertical paylines. Paylines 1× and X are the two diagonals of the arrangement.

It can be seen that the possible paylines are dramatically improved over the conventional nine-window arrangement of the prior art, shown in FIG. 1. Also, the rectangular arrangement of the inventor's 4×4 arrangement of windows dramatically improves the ease of determining winning paylines, as compared to the numerous diagonals and different numbers of windows in a line, of the prior art non-rectangular arrangement shown in FIG. 2. The patron is most familiar with the horizontal and two-diagonal paylines of prior art machines, and can easily view vertical paylines, for the same reason. It is therefore believed that the 4×4 arrangement of windows is a dramatic improvement over the prior art arrangements of windows.

An additional factor that enhances the play of the 4×4 arrangement of windows 88, is the relation of the symbols in the windows to roulette. This relation increases the number of possible combinations that may be displayed in the windows, and also increases the flexibility for different types of payouts that would not be possible with prior art slot machines. More specifically, the roulette wheel actually uses two symbols on each "slot": (1) a numeral, and (2) a background color. For this reason, there is a possible winning combination with either of the two symbols displayed in a particular window.

As with the first embodiment, there are preferably four different levels of possible winning combinations: (1) very small, frequent rewards; (2) medium-size less frequent rewards; (3) a standard mini-jackpot (such as $10,000); and (4) a large progressive jackpot. The four different levels of winning are directly related to the number of coins which a patron spends on each spin, with the higher rewards associated with more coins played. One example of a payout schedule is set forth in the following table.

| Symbols displayed in a payline | Payout |
|---|---|
| Four black slots | Small |
| Four red slots | Small |
| 3 of same number | Medium |
| Four green slots | Medium |
| 4 of same number (paylines I–IX) | Large |
| 4 of same number (payline X) | Mini-Jackpot |
| 4 of number 37 (paylines I–IX) | Spin Bonus |
| 4 of number 37 (payline X) | Progressive Jackpot |

As with the first embodiment, it is preferred that the payouts also be directly related to the number of coins that are spent by a patron on an individual round, with the higher possible payouts being only possible if the patron spends 3 or 4 coins on the round. Because of the relation to the game of roulette, and the use of a combination of two symbols in each window, the possible winning combinations are dramatically changed from any known prior art slot machines.

A plurality of selection buttons 90, individually identified as A–M, are provided on operating surface 76 below the display screen. Buttons 90 provide the patron with numerous possibilities for betting. For example, button H would permit the patron select a particular payline for a bet. Button J would permit the patron to select the amount of the bet. Button K would permit the patron to bet one credit on every payline. Button L would permit the patron to spin the reels (or to cause the machine to randomly change all of the symbols in the windows). Button M would permit the patron to repeat the last bet and spin the reels.

Buttons A–F are shaped differently, and intended to merely provide information to the patron. For example, button A would permit the patron to change a selection. Button B would display the past payouts. Button C would permit the patron to cash out. Button D would provide other related information about the game. Button E would permit the patron to obtain a credit voucher. Button F would be a "help" button.

Finally, button G would provide the spin for the bonus round, displayed on roulette wheel 84 on the upper operable surface, when applicable. Obviously, the spin buttons could also be operated by an arm on the side of the machine, as in prior art mechanical slot machines, if the patron so desires.

It can therefore be seen that the second embodiment of the invention provides the patron with numerous variables in wagering and possible winning combinations, without requiring the patron to follow weaving paylines or unusual and unaccustomed angles to determine if they have received a winning combination.

Whereas the invention has been shown and described in connection with the preferred embodiments thereof, many modifications, substitutions and additions may be made which are within the intended broad scope of the appended claims.

What is claimed is:

1. A gaming display for use in a gaming apparatus, comprising:

a plurality of independently and randomly selected symbols disposed in a rectangular positional array of four rows and four columns of windows;

a plurality of individually selectable straight paylines respectively intersecting four rows, four columns and two diagonals of four symbols displayed in the windows of said array, whereby the outcome of a gaming sequence using said display is a function of the symbols displayed along a selected one or more of said paylines;

each symbol being comprised of a combination of a color and an alphanumeric character, whereby the outcome of a gaming sequence using said display is a function of the alternative selection of either a color or character symbol displayed in the windows along a selected one or more of said paylines;

each window randomly selectively displaying one of thirty eight different character symbols;

each window randomly displaying one of four different color symbols; and each window randomly displaying one of eighteen symbols of a first color, one of eighteen symbols of a second color, one of one symbol of a third color or one of one symbol of a fourth color.

2. The gaming display of claim 1, wherein each color symbol is a color of an alphanumeric character symbol.

3. The gaming display of claim 1, wherein each color symbol is a background color upon which an alphanumeric character symbol is displayed.

4. A gaming apparatus, comprising:

a housing having a front operable surface with a visual display region thereon;

a display screen on the housing for displaying the operation of a roulette wheel of the type having four different colored balls simultaneously moving around a roulette wheel, each ball operable to fall within one of thirty-eight slots on the wheel and the slots of a size to receive up to all four balls;

said visual display region including four windows, each window associated with one of said balls on the roulette wheel and displaying a symbol displayed in a slot within which the associated ball falls at the end of a gaming sequence;

means on the housing for causing a gaming sequence to occur, whereby the displayed roulette wheel is caused to spin and the four balls are moved around the wheel to randomly fall within a slot on the wheel; and means for identifying and generating a payout at the conclusion of a gaming sequence upon the display of predetermined symbols in a predetermined number of windows.

5. The gaming apparatus of claim 4, wherein each is comprised of a combination of a color symbol and an alphanumeric character symbol, whereby the means for identifying and generating a payout at the conclusion of a gaming sequence is a function of the alternative selection of either a color or character symbol displayed in the windows.

6. The gaming display of claim 5, wherein each slot on the wheel includes one of thirty-eight different alphanumeric characters.

7. The gaming display of claim 6, wherein each slot on the wheel includes one of four different color symbols.

8. The gaming display of claim 7, wherein the wheel includes eighteen slots having a first color, eighteen slots having a second color, one slot having a third color and one slot having a fourth color.

* * * * *